United States Patent
Guo

(10) Patent No.: US 12,095,542 B2
(45) Date of Patent: Sep. 17, 2024

(54) METHODS AND DEVICES FOR DETERMINING SPATIAL RELATION, USER EQUIPMENT AND NETWORK DEVICE

(71) Applicant: GUANGDONG OPPO MOBILE TELECOMMUNICATIONS CORP., LTD., Guangdong (CN)

(72) Inventor: Li Guo, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 337 days.

(21) Appl. No.: 17/552,081

(22) Filed: Dec. 15, 2021

(65) Prior Publication Data

US 2022/0109487 A1 Apr. 7, 2022

Related U.S. Application Data

(63) Continuation of application No. PCT/CN2020/102128, filed on Jul. 15, 2020.

(60) Provisional application No. 62/878,053, filed on Jul. 24, 2019.

(51) Int. Cl.
*H04B 7/06* (2006.01)
*H04L 5/00* (2006.01)

(52) U.S. Cl.
CPC ......... *H04B 7/0697* (2013.01); *H04L 5/0023* (2013.01); *H04L 5/0048* (2013.01)

(58) Field of Classification Search
CPC .... H04B 7/0697; H04L 5/0023; H04L 5/0048
See application file for complete search history.

(56) References Cited

U.S. PATENT DOCUMENTS

| | | | |
|---|---|---|---|
| 11,937,098 B2* | 3/2024 | Zhang | H04W 16/28 |
| 2020/0053717 A1* | 2/2020 | Zhou | H04W 72/51 |
| 2020/0404690 A1* | 12/2020 | Lee | H04L 5/005 |
| 2021/0306867 A1* | 9/2021 | Hamidi-Sepehr | H04W 16/28 |

(Continued)

FOREIGN PATENT DOCUMENTS

WO 2019136728 A1 7/2019

OTHER PUBLICATIONS

International Search Report (ISR) dated Sep. 28, 2020 for Application No. PCT/CN2020/102128.

(Continued)

*Primary Examiner* — Deepa Belur
(74) *Attorney, Agent, or Firm* — Ladas & Parry LLP

(57) ABSTRACT

The embodiments of the present application provide methods and devices for determining a spatial relation, user equipment (UE) and network device. The method includes: receiving, by UE, first configuration information from a network device, the first configuration information being used to determine N transmission configuration indicator (TCI) state configurations, N being a positive integer; wherein each of the N TCI state configuration is used to determine a reference signal, the reference signal is used to determine a quasi co-location (QCL) type D parameter, the QCL type D parameter is used by the UE to receive physical downlink shared channel (PDSCH); the reference signal is further used to determine a spatial relation information, the spatial relation information is used by the UE to transmit physical uplink shared channel (PUSCH).

14 Claims, 4 Drawing Sheets

A network device sends first configuration information to UE, the UE receives the first configuration information from the network device, the first configuration information being used to determine N TCI state configurations, N being a positive integer; wherein each of the N TCI state configurations is used to determine a reference signal, the reference signal is used to determine a QCL type D parameter, the QCL type D parameter is used by the UE to receive PDSCH; the reference signal is further used to determine a spatial relation information, the spatial relation information is used by the UE to transmit PUSCH.

(56) References Cited

U.S. PATENT DOCUMENTS

| | | | |
|---|---|---|---|
| 2022/0131668 A1* | 4/2022 | Matsumura | H04L 5/0048 |
| 2022/0231810 A1* | 7/2022 | Matsumura | H04L 5/0091 |
| 2022/0239431 A1* | 7/2022 | Okamura | H04W 52/146 |
| 2023/0262820 A1* | 8/2023 | Song | H04B 7/06964 |
| | | | 370/329 |
| 2024/0048333 A1* | 2/2024 | Bhamri | H04B 7/0695 |

OTHER PUBLICATIONS

OPPO:"Text proposals for Beam management" 3GPP TSG RAN WG1 Meeting #94bis R1-1811634, Oct. 12, 2018 (Oct. 12, 2018), section 5.1.5.
NTT Docom, Inc. "Discussion on multi-beam enhancement" 3GPP TSG RAN WG1 #97 R1-1906225, May 17, 2019 (May 17, 2019), section 3.2.
OPPO:"Text proposals for Beam management" 3GPP TSG RAN WG1 Meeting #94bis R1-1810971, Oct. 12, 2018 (Oct. 12, 2018), section 5.1.5.
LG Electronics. "Feature lead summary#3 of Enhancements on Multi-beam Operations" 3GPP TSG RAN WG1 Meeting #97 R1-1907860, May 17, 2019(May 17, 2019), section 3.5.
OPPO:"Discussion on Multi-beam Operation Enhancements" 3GPP TSG RAN WG1 #97 R1-1906288, May 17, 2019 (May 17, 2019), the whole document.

\* cited by examiner

A network device sends first configuration information to UE, the UE receives the first configuration information from the network device, the first configuration information being used to determine N TCI state configurations, N being a positive integer; wherein each of the N TCI state configurations is used to determine a reference signal, the reference signal is used to determine a QCL type D parameter, the QCL type D parameter is used by the UE to receive PDSCH; the reference signal is further used to determine a spatial relation information, the spatial relation information is used by the UE to transmit PUSCH. — 301

FIG. 3

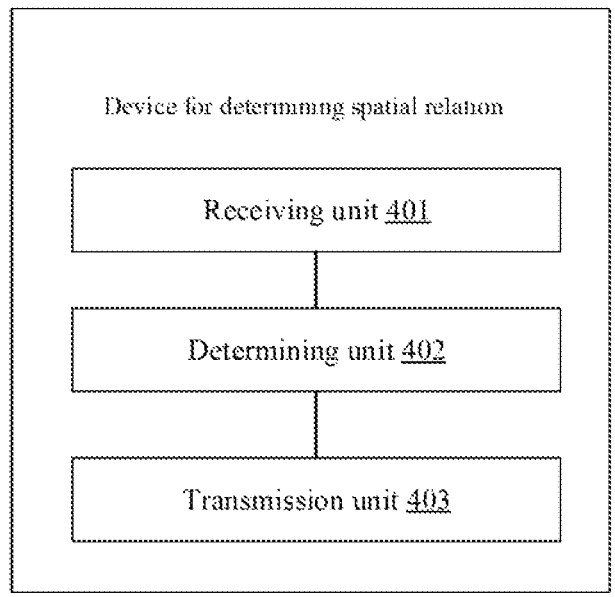

FIG. 4

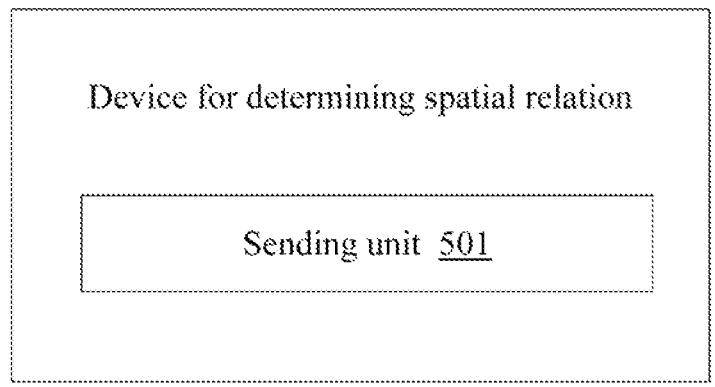

FIG. 5

METHODS AND DEVICES FOR DETERMINING SPATIAL RELATION, USER EQUIPMENT AND NETWORK DEVICE

CROSS-REFERENCE TO RELATED APPLICATIONS

This application is a continuation of International Application No. PCT/CN2020/102128, filed on Jul. 15, 2020, which claims priority to U.S. patent application Ser. No. 62/878,053, filed on Jul. 24, 2019. The disclosures of the aforementioned applications are hereby incorporated by reference in their entireties.

TECHNICAL FIELD

The embodiments of the present disclosure relate to a technical field of the mobile communications, and particularly, to methods and devices for determining a spatial relation, user equipment (UE) and network device.

BACKGROUND

When UE performs physical uplink control channel (PUSCH) transmission, a transmit beam (Tx beam) needs to be determined to transmit PUSCH by using the transmit beam. UE determines the transmit beam based on the spatial relation information. At present, however, the determination of spatial relation information of PUSCH needs to be based on the configuration of sounding reference signal (SRS) resources. Determining spatial relation information of PUSCH in this way will cause signaling waste and cannot be well adapted to the mobile environment.

SUMMARY

The embodiments of the present disclosure provide methods and devices for determining a spatial relation, user equipment (UE) and network device.

The embodiments of the present disclosure provide a method for determining a spatial relation, including: receiving, by user equipment (UE), first configuration information from a network device, the first configuration information being used to determine N transmission configuration indicator (TCI) state configurations, N being a positive integer; wherein each of the N TCI state configuration is used to determine a reference signal, the reference signal is used to determine a quasi co-location (QCL) type D parameter, the type D parameter is used by the UE to receive physical downlink shared channel (PDSCH); the reference signal is further used to determine a spatial relation information, the spatial relation information is used by the UE to transmit physical uplink shared channel (PUSCH).

The embodiments of the present disclosure provide a method for determining spatial relation, including: sending, by a network device, first configuration information to user equipment (UE), the first configuration information being used to determine N TCI state configurations, N being a positive integer; wherein each of the N TCI state configurations is used to determine a reference signal, the reference signal is used to determine a quasi co-location (QCL) type D parameter, the QCL type D parameter is used by the UE to receive physical downlink shared channel (PDSCH); the reference signal is further used to determine a spatial relation information, the spatial relation information is used by the UE to transmit physical uplink shared channel (PUSCH).

The embodiments of the present disclosure provide a device for determining spatial relation, applied to user equipment (UE) the device including: a receiving unit configured to receive first configuration information from a network device, the first configuration information being used to determine N transmission configuration indicator (TCI) state configurations, N being a positive integer; wherein each of the N TCI state configuration is used to determine a reference signal, the reference signal is used to determine a quasi co-location (QCL) type D parameter, the QCL type D parameter is used by the UE to receive physical downlink shared channel (PDSCH); the reference signal is further used to determine a spatial relation information, the spatial relation information is used by the UE to transmit physical uplink shared channel (PUSCH).

The embodiments of the present disclosure provide a device for determining spatial relation, applied to a network device, the device for determining spatial relation including: a sending unit configured to send first configuration information to user equipment (UE), the first configuration information being used to determine N TCI state configurations, N being a positive integer; wherein each of the N TCI state configurations is used to determine a reference signal, the reference signal is used to determine a quasi co-location (QCL) type D parameter, the QCL type D parameter is used by the UE to receive physical downlink shared channel (PDSCH); the reference signal is further used to determine a spatial relation information, the spatial relation information is used by the UE to transmit physical uplink shared channel (PUSCH).

The embodiments of the present disclosure provide UE, including: a processor and a memory for storing a computer program, the processor being configured to call and run the computer program stored in the memory to perform the method for determining a spatial relation.

The embodiments of the present disclosure provide a network device, including: a processor and a memory for storing a computer program, the processor being configured to call and run the computer program stored in the memory to perform the method for determining a spatial relation as described above.

The embodiments of the present disclosure provide a chip for implementing the method for determining a spatial relation as described above. The chip includes a processor configured to call and run a computer program stored in a memory to make a device having installed thereon the chip to perform the method for determining a spatial relation as described above.

The embodiments of the present disclosure provide a non-transitory computer-readable storage medium having stored thereon a computer program which makes a computer to perform the method for determining a spatial relation as described above.

The embodiments of the present disclosure provide a computer program product, including computer program instructions which make a computer to perform the method for determining a spatial relation as described above.

The embodiments of the present disclosure provide a computer program for causing a computer to perform the method for determining a spatial relation as described above.

In the technical solution of the embodiments of the present disclosure, the network device configures N TCI state configurations for UE, the reference signal in each TCI state configuration not only can be used to determine QCL type D parameter, and but also can be used to determine spatial relation information, UE can receive PDSCH by using the QCL type D parameter determined based an the reference signal, and transmit PUSCH by using the spatial relation information determined based on the reference signal.

According to at least some embodiments of the present disclosure, the system uses the same set of TCI states for Tx beam indication for PDSCH reception and PUSCH transmission to the UE. In each TCI state configuration, the UE can be configured with a reference signal (RS) for QCL-type D for PDSCH transmission and a RS for spatial relation information parameter for PUSCH transmission. The network device can indicate one TCI state through a scheduling DCI for the PUSCH and the UE can derive the Tx beam information for that PUSCH transmission according to the RS for spatial relation information parameter configured in the indicated TCI state. The proposed methods remove the redundant higher layer signaling for Tx beam configuration for uplink transmission. Thus they can reduce the signaling overhead for multi-beam operation and improve the system throughput.

BRIEF DESCRIPTION OF DRAWINGS

The drawings described herein are used to provide a further understanding of the application and form a part of the application. The schematic embodiments of the application and the description thereof are used to explain the application and do not constitute an improper limitation of the application. In the drawings:

FIG. 3 is a flow chart of a method for determining a spatial relation according to at least some embodiments of the present disclosure;

FIG. 4 is a first structural diagram of a device for determining a spatial relation according to at least some embodiments of the present disclosure;

FIG. 5 is a second structural diagram of a device for determining a spatial relation according to at least some embodiments attic present disclosure;

DESCRIPTION OF EMBODIMENTS

The technical solution in the embodiments of the application will be described below in conjunction with the drawings in the embodiments of the application. It is apparent that the described embodiments are a part of the embodiments of the application, not all of the embodiments. Based on the embodiments in the application, all other embodiments obtained by those skilled in the art without creative of belong to the protection scope of the application.

The technical solutions of the embodiments of the present disclosure may be applied to various communication systems, such as long term evolution (LTE) system, LTE frequency division duplex (FDD) system, LTE time division duplex (TDD), system, 5th generation (5G) communication system or future communication system, etc.

Figure 1:
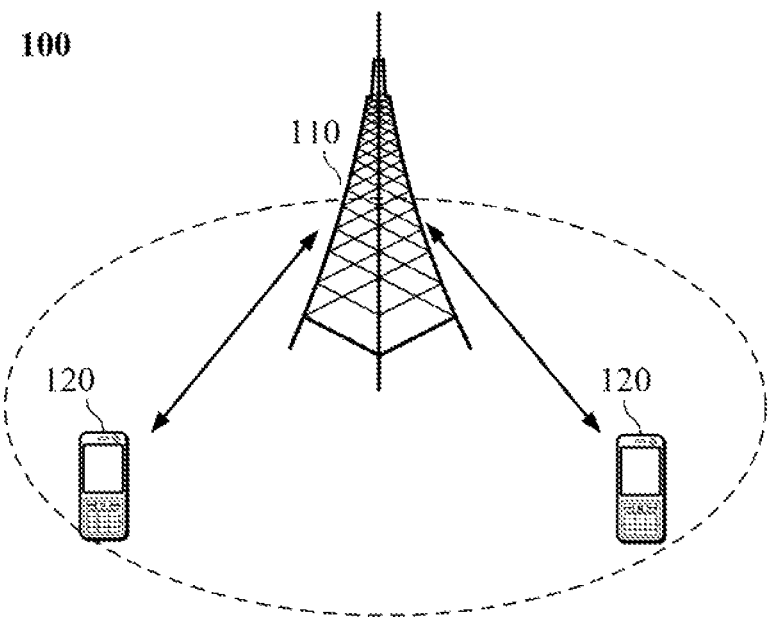
FIG. 1 is a schematic diagram of an architecture of a communication system according to at least some embodiments of the present disclosure.

Exemplarily, the communication system 100 to which the embodiments of the present disclosure is applied is illustrated in FIG. 1. The communication system 100 may include a network device 110, which may be a device communicating with a terminal 120 (also referred to as a communication terminal, terminal). The network device 110 may provide communication coverage for a specific geographic area and may communicate with a terminal located within the coverage area. Alternatively, the network device 110 can be an Evolutional base station (Evolutional Node B, eNB or eNodeB) or a wireless controller in network in a cloud radio access network (CRAN) in an LTE system, or the network device can be mobile switching center, relay station, access point, on-board equipment, wearable equipment, hub, switch, bridge, router, network-side device in 5G network or network device in a future communication system, etc.

The communication system 100 also includes at least one terminal 120 located within the coverage of the network device 110. The "terminal" used herein includes but is not limited to the connection via wired lines, such as public switched telephone networks (PSTN) and digital subscriber lines Line, DSL, digital cable, direct cable connection; and/or another data connection/network; and/or via wireless interface, such as for cellular network, wireless local area network (WLAN), such as DVB-H Digital television network, satellite network, AM-FM broadcast transmitter of the network; and/or device set to receive/send communication signals of another terminal; and/or Internet of things (IOT) device. A terminal set to communicate via a wireless interface may be referred to as a "wireless communication terminal", "wireless terminal" or "mobile terminal". Examples of mobile terminals include, but are not limited to, satellites or cellular phones; personal communications systems that can combine cellular radiotelephony with data processing, fax, and data communication capabilities System (PCS) terminals; PDAs that may include radiophones, payers, internet/intranet access, web browsers, notebooks, calendars, and/or global positioning system (GPS) receivers; and conventional laptop and/or handheld receivers or other electronic devices including radiophone transceivers. Terminal can refer to access terminal, user equipment (UE), user unit, user station, mobile station, mobile station, remote station, remote terminal, mobile device, user terminal, terminal, wireless communication device, user agent or user device. Access terminals can be cellular telephone, cordless telephone, session initiation protocol (SIP) telephone, wireless local loop (WLL) station, personal digital processing (PDP) Assistant, handheld device with wireless communication function, computing device or other processing device connected to wireless modem, on-board device, wearable device, terminal in 5g network or terminal in public land mobile network (PLMN) evolving in the future.

In an embodiment, the terminals 120 may perform communications on. Device-to-Device (D2D) direct connection.

In an embodiment, a 5G communication system or 5G network may also be referred to as New Radio (NR) system or NR system.

FIG. 1 illustrates an example of a network device and two terminals. Alternatively, the communication system 100 may include a plurality of network devices and there may be other numbers of terminals within the coverage of each network device, which is not limited bye the embodiments of the present disclosure.

Alternatively, the communication system 100 may also include other network entities such as a network controller, a mobile management entity, etc., which are not limited by the embodiments of the present disclosure.

It is to be understood that devices having communication functions in the network/system according to the embodiments of the present disclosure may be referred to as communication devices. Taking the communication system 100 illustrated in FIG. 1 as an example, the communication device mays include the network device 110 and the terminal 120 with the communication function. The network device 110 and the terminal 120 may be the specific devices as described above, which will not be described here in detail. The communication device may also include other devices in the communication system 100, such as the network controller, the mobile management entity and other network entities, which are not limited in the embodiment of the present disclosure.

It is to be understood that the terms "system" and "network" herein are often used interchangeably. Herein, the term "and/or" is just a kind of association relation describing the associated object, which means that there can be three kinds of relations, for example, A and/or B, which means that there is A alone, A and B at the same time, and B alone. In addition, the character "/" in this paper generally indicates that the relation between the front and back related objects is a kind of "or".

To facilitate the understanding of the technical solution of the embodiments of the disclosure, the technical solution related to the embodiments of the disclosure will be described below.

The 5G (fifth generation) wireless systems are generally a multi-beats based system in frequency band 2 (FR2), where multiplex Tx and Rx analog beams are employed by a base station (BS) and/or UE to combat the large path loss in high frequency band. In high frequency band system, for example minWave systems, the BS and the UE are deployed with large number of antennas so that large gain beamforming can be used to defeat the large path loss and signal blockage. Due to the hardware limitation and cost, the BS and the UE might only be equipped with limited number of TXRUs (transmission and reception unit). Therefore, hybrid beamforming mechanisms can be utilized in both BS and UE. To get the best link quality between the BS and the UE, the BS and the UE need to align the analog beam directions for particular downlink or uplink transmission. For downlink transmission, they need find the best pair of BS Tx beam and UE Rx beam while for uplink transmission, they need to find the best pair of UE Tx beam and BS Rx beam.

For the communication between one UE and a BS, the BS and the LE need to determine which Tx and Rx beam are going to be used. When one UE moves, the beams used by the BS and the UE for communication might change. In 3GPP 5G specification, the following functions are defined to support such multi-beam-based operation: beam measurement and reporting, beam indication and beam switch.

In current design of NR release 15, for PUSCH transmission, the gNode B (gNB) shall first configure a set of SRS resources that is dedicated for that PUSCH transmission to the UE. The usage of that set of SRS resources can be set to be 'codebook' or 'non-codebook'. To schedule a PUSCH transmission, the gNB can send one downlink control information (DCI) format to the UE and in the DCI format, a bit-field resource indicator (SRI) is used to indicate one or more SRS resources from that SRS resource set dedicated for PUSCH transmission. For the UE to determine the Tx beam (transmit beam) for that PUSCH, the UE shall derive it based on the Tx beam information configured to the SRS resource dedicated for PUSCH transmission. If the gNB needs to change the Tx beam for PUSCH transmission, the gNB would have to use higher layer signaling to change the Tx beam configuration of those SRS resources dedicated for PUSCH transmission. The Tx beam con figured to the SRS resources dedicated for PUSCH transmission can be an SRS resource, a channel state information-reference signal (CSI-RS) resource or a synchronize signal (SS)/physical broadcast channel (PBCH) block.

Figure 2A:
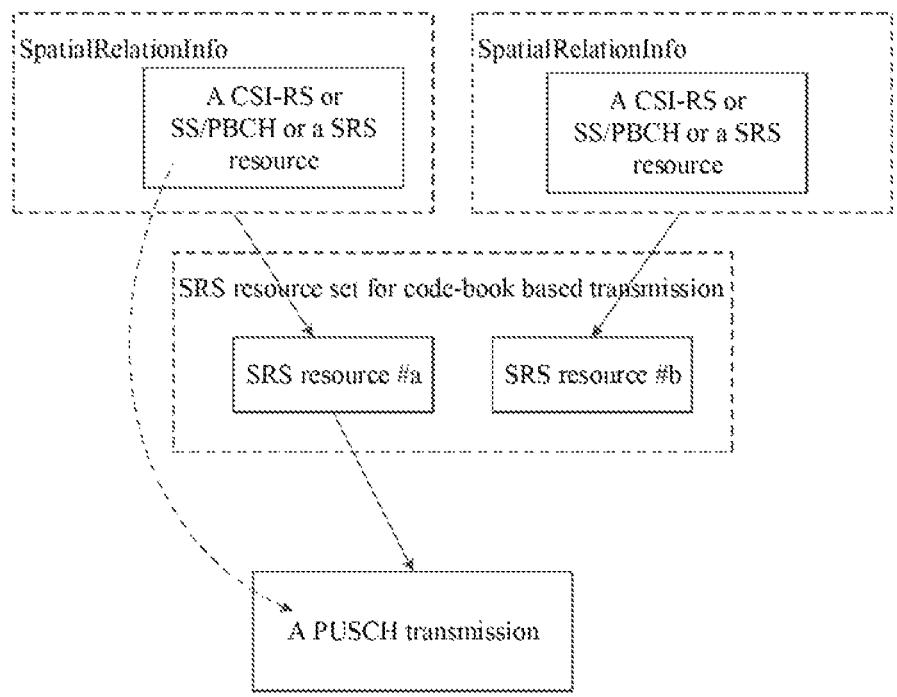
FIG. 2A is a design diagram of codebook-based PUSCH according to at least some embodiments of the present disclosure.

The design for codebook based PUSCH is illustrated in FIG. 2A. For codebook-based PUSCH transmission, the UE is configured with SRS resource set with usage set to "codebook", which is dedicated for codebook-based transmission. That set can contain one or two SRS resources. Each SRS resource is configured with a parameter SpatialRelationInfo that contain reference signal ID (CSI-RS or SS/PBCH or SRS) to provide a reference for spatial relation information. For one PUSCH transmission, the gNB indicates one SRS resource from that set to the UE and the UE derives Tx beam for the PUSCH based on the SpatialRelationInfo configured to the indicated SRS resource. In the example illustrated in FIG. 2A, the gNB indicates SRS resource #a for PUSCH transmission and the UE shall use the CSI-RS or SS/PBCH or SRS source that is configured as spatial relation information reference to the SRS resource #a as the Tx beam for PUSCH transmission.

Figure 2B:
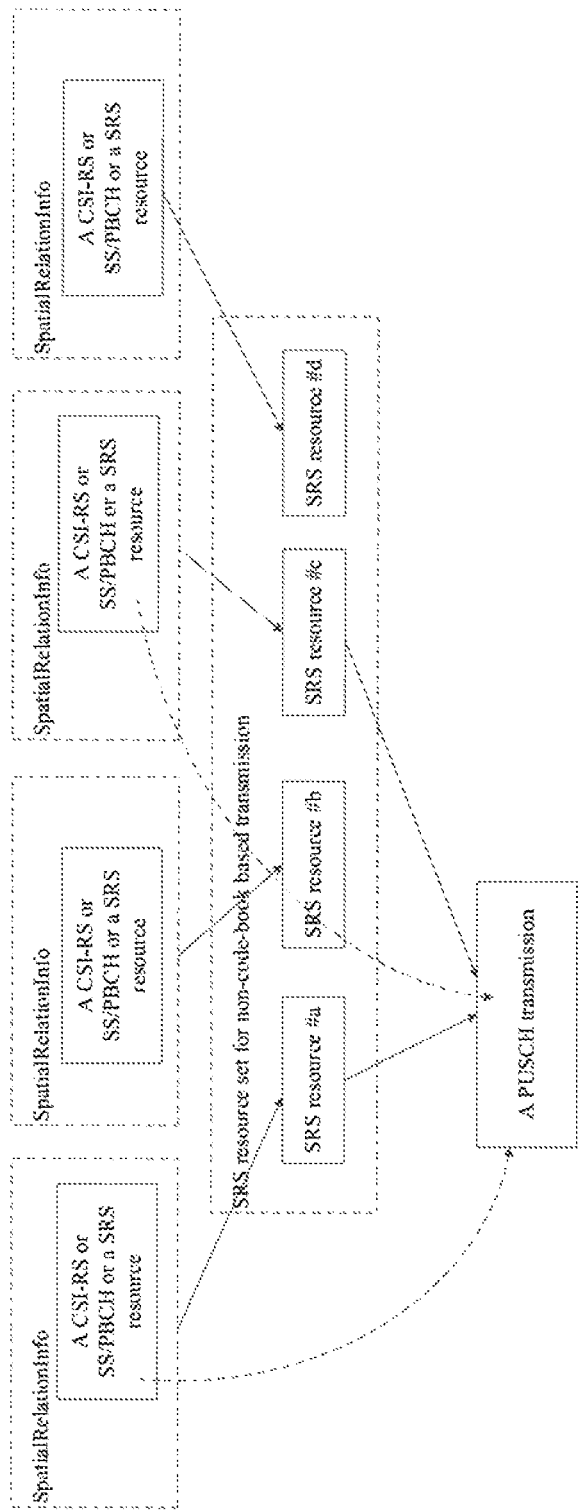
FIG. 2B is a design diagram of non-codebook-based PUSCH according to at least some embodiments of the present disclosure.

The Tx beam indication method for non-codebook-based PUSCH is similar to that of codebook-based PUSCH, which is illustrated by one example in FIG. 2B.

The drawbacks of current design include:

The Tx beam for a PUSCH is not configured to PUSCH directly but uses an SRS resource as bridge. The consequence is excessive higher layer signaling overhead for Tx beam switching. As illustrated in FIG. 2A, the gNB would have to use higher layer signaling (for example RRC) to re-configure the SRS resource #a and SRS resource #b to switch Tx beam for PUSCH. For non-codebook-based PUSCH, as illustrated in FIG. 2B, the gNB would have to use higher layer signaling (for example RRC) to re-configure the SRS resources #a/#b/#c/#d to switch Tx beam for PUSCH.

Large latency caused by beam switch operation. As explained above, PUSCH beam switching requires higher layer reconfiguration. Besides signaling overhead, it also causes large latency to multi-beam operation. The current design of PUSCH beam indication does not work well for mobile environment due to this issue.

Increasing the number of SRS resources in the set configured for PUSCH can improve the flexibility of PUSCH Tx beam indication. But increasing the number of SRS resources in the set configured for codebook-based or non-codebook-based PUSCH does not work. The SRS resources configured in the set for PUSCH are used for uplink CSI measurement. Generally, those SRS resources have multiple antenna ports, implement frequency hopping and occupy multiple symbols. On the other hand, all the SRS resource in one set shall be allocated in the same slot and only up to 6 symbols within one slot can be allocated to SRS transmission. Thus there is no room for us to increase the number of SRS resources in the set configured for codebook-based or non-codebook based transmission.

Waste of signaling: for UE with beam correspondence, downlink and uplink transmission generally use the same beam pair link, i.e., the best beam pair link. But in current design, the gNB has to use separate RRC and media access control control element (MAC CE) signaling to configure the beams for downlink and uplink, even though the same beam is carried in those signaling message.

In view of the above, there is provided the following solutions of the embodiments of the present disclosure. In this disclosure, the methods for indicating and switching uplink transmit beam for PUSCH transmission are proposed. In the present disclosure, a 'beam' can correspond to an RS resource, which can be a CSI-RS resource, an SRS resource, a SS/PBCH block or any other type of RS.

FIG. 3 is a flow diagram of a method for determining a spatial relation provided by an embodiment of the present disclosure. As illustrated in FIG. 3, the method for determining a spatial relation includes the following steps.

At Step 301, the network device sends the first configuration information to the UE, and the UE receives the first configuration information sent by the network device, and the first configuration information is used to determine N TCI state configurations, N is a positive integer; wherein each ICI state configuration in the N TCI state configurations is used to determine the reference signal, the reference signal is used to determine the QCL type D parameter, and the QCL type D parameter is used by the UE, to receive the PDSCH; the reference signal is also used to determine the spatial relation information, which is used by the UE to transmit the PUSCH.

In the embodiment of the disclosure, the network device can be a base station (BS), such as gNB, eNB.

In the embodiments of the present disclosure, UE can be configured with one or multiple TCI (transmission configuration indicator) states and those TCI states can be used to decode PDSCH and to transmit PUSCH. In an implementation, UE can be configured with a list of up to N TCI-State configurations within the higher layer parameter to decode PDSCH according to a detected PDCCH with DCI intended for the UE and to transmit PUSCH according to a detected PDCCH with DCI intended for the UE.

In the embodiments of the present disclosure, in each TCI state configuration, the UE can be configured with reference signals to provide quasi co-location relationship for the purpose of decoding PDSCH and to provide spatial relation information for the purpose of transmitting PUSCH. In an implementation, in each TCI-state configuration, the UE can be configured with parameters for configuring a quasi co-location relationship between one or more reference signals and the dedicated demodulation-reference signal (DM-RS) ports of the PDSCH and/or parameters for configuring spatial relation between a RS (reference signal) and the target PUSCH transmission Each TCI-state can contain one or more reference signals (RSs) to provide one or more of the following information for decoding PDSCH and/or transmitting PUSCH:

Spatial relation between a RS and the target PUSCH
QCL-Type D (i.e., spatial Rx parameter) for decoding PDSCH
QCL-Type A/B/C for decoding PDSCH.

It is to be noted that "target PUSCH" in the above implementation may be also referred to as "first PUSCH" hereafter.

It is to be noted that the following description is made by exemplifying that one reference signal is included in the TCI state configurations. However, the number of the reference signals in the TCI state configurations may be plural.

In the embodiments of the present disclosure, when one TCI state is indicated for a PDSCH transmission (for example through a DCI scheduling a PDSCH transmission), the UE shall derive the quasi co-location relationship between the reference signal resource(s) contained in the indicated TCI state and the DM-RS ports of the scheduled PDSCH. And when one TCI state is indicated for a PUSCH transmission (for example through a DCI scheduling a PUSCH transmission), the UE shall derive the spatial relation information for the transmission on the scheduled PUSCH according the reference signal resource(s) contained in the indicated TCI state.

In one TCI-state, if there is a RS configured for QCL-Type D for decoding PDSCH, the UE can assume the RS is configured as spatial relation reference for the PUSCH.

In the embodiments of the disclosure, the network device sends the second configuration information to the UE, and accordingly, the UE receives the second configuration information sent by the network device, and the second configuration information is used to determine the configuration of the control resource set (CORESET); the network device sends the first DCI to the UE based on the CORESET configuration, and correspondingly, the UE receives the first DCI sent by the network device based on the CORESET configuration, the first DCI is used for scheduling the first PUSCH transmission.

In an implementation, the second configuration information carries the first indication information, the first indication information is used to indicate whether the second indication information is carried in the first DCI or that the second indication information is carried in the first DCI, the second indication information is used to indicate the first TCI state configuration in the N TCI state configurations, and the first TCI state configuration is used for the first PUSCH transmission.

In an example, the second indication information is a first bitmap, each bit in the first bitmap corresponds to one of the N TCI state configurations, and the value of the bit is used to indicate whether the TCI state configuration corresponding to the bit is used for the first PUSCH transmission. It is be noted that in the subsequent application example, the second indication information is carried in bit field A0.

It will be described below how the UE determines the spatial relation information for transmitting the first PUSCH in conjunction with different situations.

In a first scenario, when the first indication information is used to indicate that the first DCI carries the second indication information, the first reference signal in the first TCI state configuration is used for the UE to determine the first spatial relation information, and the first spatial relation information is used for the UE to transmit the first PUSCH.

Specifically, the UE determines the first spatial relation information based on the first reference signal in the first TCI state configuration; the UE transmits the first PUSCH based on the first spatial relation information.

In a second scenario, when the first indication information is used to indicate that the first DCI does not carry the second indication information, or the second configuration information does not carry the first indication information, the second reference signal in the second TCI state configuration is used for the UE to determine the second spatial relationship information, and the second spatial relation information is used for the UE to transmit the first PUSCH.

Specifically, the UE determines the second spatial relation information based on the second reference signal in the second TCI state configuration; the UE transmits the first PUSCH based on the second spatial relation information.

Here, in an implementation, the second TCI state configuration is the TCI state configuration associated with CORESET, wherein the second TCI state configuration is used to determine the second reference signal, the second reference signal is used to determine the QCL type D parameter and the second spatial relation information.

Here, in another implementation, the second TCI state configuration is the default TCI state configuration of the N TCI state configurations. Farther, the default TCI state configuration is the TCI state configuration with the smallest serial number among the N TCI state configurations; or, the default TCI state configuration is the TCI state configuration with the largest serial number among the N TCI state configurations.

The technical solution of the embodiment of the present disclosure will be illustrated as follows in conjunction with specific application examples.

First Example

When the TCI-state is signaled for a PDSCH transmission (for example through DCI format 1_1 or DCI format 1_1), the UE can be requested to use the TCI-state according to the value indicated in the scheduling DCI for determining PDSCH antenna port quasi co-location. The UE may assume that the DM-RS ports of the scheduled PDSCH are quasi co-located with the RS(s) in the TCI state with respect to the QCL type parameter(s) configured in the indicated TCI state. Particularly, the UE may assume that the DM-RS ports of the scheduled PDSCH are quasi co-located with the RS configured for spatial Rx parameter in the TCI state with respect to the QCL type D. When the TCI state in signaled for a PUSCH transmission (for example through DCI format 0_1 or 0_0), the UE can be requested to use the TCI-state according to the value indicated in the scheduling DCI for determining spatial relation between a reference RS and the scheduled PUSCH. In particular, the UE can assume the RS configured for QCL-type D in the TCI-state provides spatial relation for the scheduled PUSCH. If that RS is a CSI-RS resource or SS/PBCH block, the UE shall transmit the PUSCH and associated DM-RS with same spatial domain transmission filter used for reception of the reference signal resource configured for QCL-type D in the TCI-state. If that RS is a SRS resource, the UE shall transmit the PUSCH and associated DM-RS with same spatial domain transmission filter used to transmit the SRS configured for QCL-type D in the TCI state.

In one method, a bit-field A0 in DCI scheduling PUSCH transmission can be used to indicate a TCI-state and one codepoint of bit-field A0 can correspond to one TCI state. If none of configured TCI states contains RS for 'QCL-type D', the FE can assume the bit length of bit-field A0 is zero. The gNB can use an activation command to map N TCI states to the codepoints of the DCI field "Transmission Configuration indication" in DCI scheduling PDSCH transmission and also to the codepoints of the DCI field A0 in DCI scheduling PUSCH transmission.

Second Example

In a TCI-state, one or more RS can be configured explicitly for spatial relation for PUSCH transmission. The UE can be configured with a list of up to M TCI-state configurations through higher layer parameters. One TCI-state can provide the configuration of quasi co-location relationship between reference signal resource(s) and DM-RS port(s) of PDSCH for decoding PDSCH and provide the configuration of spatial relation between reference signal resource(s) and the scheduled PUSCH transmission. In one TCI-state, the UE can be configured with one or more reference signal resources and each of those RSs can be configured with type of quasi co-location for PDSCH and/or spatial relation for PUSCH. For each RS configured in one TCI state, the UE can be configured with One of the QCL type: QCL type A/B/C/D Spatial relation parameter.

If one RS contained in a TCI-state in configured as spatial relation parameter, then the UE can use it as spatial relation reference for a PUSCH transmission. An example of higher layer configuration parameter according to the invention in this disclosure is given in Table 1.

TABLE 1

| | | |
|---|---|---|
| TCI-State ::= | SEQUENCE { | |
| tci-StateId | TCI-StateId, | |
| qcl-Type1 | QCL-Info, | |
| qcl-Type2 R | QCL-Info | OPTIONAL, -- Need |
| ... | | |
| } | | |
| QCL-Info ::= | SEQUENCE { | |
| cell | ServCellIndex | OPTIONAL, -- Need R |
| bwp-Id | BWP-Id | OPTIONAL, -- Cond |
| CSI-RS-Indicated | | |
| referenceSignal | CHOICE { | |
| csi-cs | NZP-CSI-RS-ResourceId, | |
| ssb | SSB-Index | |
| srs | SRS-ResourceId | |
| }, | | |
| qcl-Type | ENUMERATED {typeA, typeB, typeC, typeD}, | |
| spatial-Relation | ENUMERATED {enabled} | OPTIONAL |
| ... | | |
| } | | |

As illustrated in Table 1, a RS (CSI-RS, SS/PBCH block or SRS resource) contained in one TCI-State can be configured with a parameter spatial-Relation. If the parameter spatial-Relation for a RS is set as 'enabled', then that UE can be used as spatial relation reference for a PUSCH transmission.

When the TCI-state is signaled for a PDSCH transmission (for example through. DCI format 1_0 or DCI format 1_1), the UE can be requested to use the state according to the value indicated in the scheduling DCI for determining PDSCH antenna port quasi co-location. The UE may assume that the DM-RS ports of the scheduled PDSCH are quasi co-located with the RS(s) in the TCI state with respect to the QCL type parameter(s) configured in the indicated TCI state. Particularly, the UE may assume that the DM-RS ports of the scheduled PDSCH are quasi co-located with the RS configured for spatial Rx parameter in the TCI state with respect to the QCL type D. When the TCI state in signaled for a PUSCH transmission (for example through DCI format 0_1 or 0_0), the UE can be requested to use the TCI-state according to the value indicated in the scheduling DCI for determining spatial relation between a reference RS and the scheduled PUSCH. In particular, the UE can assume the RS configured with higher layer parameter spatial-Relation set as 'enabled' contained in the indicated TCI-state provides spatial relation for the scheduled PUSCH. If that RS is a CSI-RS resource or SS/PBCH block, the UE shall transmit the PUSCH and associated DM-RS with same spatial domain transmission filter used for reception of the reference signal resource configured with higher layer parameter spatial-Relation set as 'enabled' contained in the TCI-state. If that RS is an SRS resource, the UE shall transmit the PUSCH and associated DM-RS with same spatial domain transmission filter used to transmit the SRS resource configured with higher layer parameter spatial-Relation set as 'enabled' contained in the TCI state.

In one method, a bit-field A0 in DCI scheduling PUSCH transmission can be used to indicate a TCI-state and one codepoint of bit-field A0 can correspond to one TCI state. If none of configured TCI states contains RS configured with higher layer parameter spatial-Relation set as 'enabled', the UE can assume the bit length of bit-field A0 is zero. The gNB can use an activation command to map N TCI states to the codepoints of the DCI field "Transmission Configuration Indication" in DCI scheduling PDSCH transmission and also to the codepoints of the DCI Third Example UE can be configured with a first PDCCH and for a PUSCH transmission scheduled by DCI detected from the first PDCCH, the UE shall use a Tx beam that corresponding to UE Rx beam or spatial Rx parameter) used to detect the first PDCCH to transmit the scheduled PUSCH. This method can enable a simplified single-beam operation where all the downlink and uplink transmission follow the same Tx beam. That is generally the real implementation for UE with beam correspondence. Such design can minimize the signaling overhead and latency for multi-beam operation for uplink transmission.

In one method, a UE can be configured with a control resource set (CORESET) and in the configuration of that CORESET, the UE can be configured with an indication for a presence of a bit-field A0 that indicates a TCI-state for PUSCH transmission in a DCI format that is used to grant a PUSCH transmission. If a CORESET is configured with the presence of bit-field A0 that is used to indicate a TCI-state for PUSCH transmission, when the UE detects a DCI scheduling a PUSCH transmission which is detected from the search space associated with that CORESET, the UE shall derive the spatial relation for PUSCH according to the TCI-state indicated by the bit-field A0 contained in the detected DCI. If a CORESET is not configured with the presence of bit-field A0 that is used to indicate a TCI-state for PUSCH transmission, when the UE detects a DCI scheduling a PUSCH transmission which is detected in the search space associated with that CORESET, the UE shall derive the spatial relation for the PUSCH according to the TCI-state configured for that CORESET:

In one example, the UE shall assume the RS configured for QCL-type D contained in the TCI-state configured for that CORESET provides the reference of spatial relation for the PUSCH transmission scheduled by DCI detected from that CORESET.

In one example, the UE shall assume the RS configured as spatial relation parameter contained in the TCI-state configured for that CORESET provides the reference of spatial relation for the PUSCH transmission scheduled by DCI detected from that CORESET.

In one method, for a PUSCH scheduled by DCI format 0_0, i.e., a fallback PUSCH, the UE can be requested to assume a default spatial relation parameter. In one example, for a fallback PUSCH, the UE shall assume the RS configured as spatial relation parameter contained in the TCI-state with lowest TCI-state ID among all the TCI-state activated for PDSCH reception. In one example, for a fallback PUSCH, the UE shall assume the RS configured as QCL Type D parameter contained in the TCI-state with lowest TCI-state ID among all the TCI-state activated for PDSCH reception.

According to at least one embodiment of the present disclosure, the system uses the same set of TCI states for Tx beam indication for PDSCH reception and PUSCH transmission to the UE. In each TCI state configuration, the UE can be configured with a RS for QCL-type D for PDSCH transmission and a RS for spatial relation information parameter for PUSCH transmission. The network can indicate one TCI state through a scheduling DCI for the PUSCH and the UE can derive the Tx beam information for that PUSCH transmission according to the RS for spatial relation information parameter configured in the indicated TCI state. The proposed methods remove the redundant higher layer signaling for Tx beam configuration for uplink transmission. Thus they can reduce the signaling overhead for multi-beam operation and improve the system throughput.

FIG. 4 is a first schematic diagram of the structure of the device for determining the spatial relation provided by the embodiment of the present disclosure, which is applied to UE. As illustrated in FIG. 4, the device for determining the spatial relation includes a receiving unit 401.

The receiving unit 401 is used to receive the first configuration information sent by the network device, the first configuration information is used to determine N TCI state configurations, N is a positive integer. Each TCI state configuration in the N TCI state configurations is used to determine a reference signal, the reference signal is used to determine the QCL type D parameter, the QCL type D parameter is used to receive the PDSCH; the reference signal is also used to determine the spatial relation information. The spatial relation information is used by the UE to transmit PUSCH.

In an implementation, the receiving unit 401 is also used to receive the second configuration information sent by the network device, which is used to determine the control resource set (CORESET) configuration; based on the CORESET configuration, the receiving unit 401 receives the first DCI sent by the network device, and the first DCI is used to schedule the first PUSCH transmission.

In an implementation, the second configuration information carries the first indication information, the first indication information is used to indicate whether the second indication information is carried in the first DCI or that the second indication information is carried in the first DCI, the second indication information is used to indicate the first TCI state configuration of the N TCI state configurations, and the first TCI state configuration is used for the first PUSCH transmission.

In an implementation, the second indication information is a first bitmap, each bit in the first bitmap corresponds to one of the N TCI state configurations, and the value of the bit is used to indicate whether the TCI state configuration corresponding to the bit is used for the first PUSCH transmission.

In an implementation, when the first indication information is used to indicate that the first DCI carries the second indication information, the device further includes a determining unit 402 and a transmission unit 403.

The determining unit 402 is configured to determine the first spatial relation information based on the first reference signal in the first TCI state configuration.

The transmission unit 403 is configured to transmit the first PUSCH based on the first spatial relation information.

In an implementation, the device also includes a determining unit 402 and transmission unit 403.

The determining unit 402 is configured to: when the first indication information is used to indicate that the first DCI does not carry the second indication information, or the second configuration information does not carry the first indication information, determine the second spatial relation information based on the second reference signal in the second TCI state configuration.

The transmission unit 403 is configured to transmit the first PUSCH based on the second spatial relation information.

In an implementation, the second TCI state configuration is the TCI state configuration associated with CORESET.

The second TCI state configuration is used to determine the second reference signal, the second reference signal is used to determine the QCL type D parameter and the second spatial relation information.

In an implementation, the second TCI state configuration is the default TCI state configuration of the N TCI state configurations.

In an implementation, the default TCI state configuration is the TCI state configuration with the smallest serial number among the N TCI state configurations;
alternatively, the default TCI state configuration is the TCI state configuration with the largest serial number among the N TCI state configurations.

It is to be understood by those skilled in the art that the relevant description of the device for determining the spatial relation in the embodiments of the disclosure can be understood with reference to the relevant description of the method for determining the spatial relation in the embodiments of the disclosure.

FIG. 5 is a schematic diagram of the structure of the device for determining the spatial relation provided by the embodiment of the present disclosure, which is applied to the network device, as illustrated in FIG. 5. The device for determining the spatial relation includes a sending unit 501.

The sending unit 501 is configured to send the first configuration information to the UE. The first configuration information is used to determine N TCI state configurations, N is a positive integer. Each TCI state configuration in the N TCI state configurations is used to determine a reference signal. The reference signal is used to determine the QCL type D parameter. The QCL type D parameter is used by the UE to receive the PDSCH. The reference signal is also used to determine the spatial relation information. The spatial relation information is used by UE to transmit PUSCH.

In an implementation, the sending unit 501 is also used to send the second configuration information to the UE, which is used to determine the control resource set CORESET configuration. Based on the CORESET configuration, the first DCI is sent to the UE, the first DCI is used to schedule the first PUSCH transmission.

In an implementation, the second configuration information carries the first indication information, the first indication information is used to indicate whether the second indication information is carried in the first DCI or that the second indication information is carried in the first DCI. The second indication information is used to indicate the first TCI state configuration of the N TCI state configurations, and the first TCI state configuration is used for the first PUSCH transmission.

In an implementation, the second indication information is a first bitmap, each bit in the first bitmap corresponds to one of the N TCI state configurations, and the value of the bit is used to indicate whether the TCI state configuration corresponding to the bit is used for the first PUSCH transmission.

In an implementation, the first indication information is used to indicate that the first DCI carries the second indication information, the first reference signal in the first TCI state configuration is used for the UE to determine the first spatial relation information, and the first spatial relation information is used for the UE to transmit the first PUSCH.

In an implementation, in case that the first indication information is used to indicate that the first DCI does not carry the second indication information, or the second configuration information does not carry the first indication information, the second reference signal in the second TCI state configuration is used for the UE to determine the second spatial relation information, which is used for the UE to transmit the first PUSCH.

In an implementation, the second TCI state configuration is the TCI state configuration associated with CORESET.

The second TCI state configuration is used to determine the second reference signal, the second reference signal is used to determine the QCL type D parameter and the second spatial relation information.

In an implementation, the second TCI state configuration is the default TCI state configuration among the N TCI state configurations.

In an implementation, the default TCI state configuration is the TCI state configuration with the smallest serial number among the N TCI state configurations.

Or, the default TCI state configuration is the TCI state configuration with the largest serial number among the N TCI state configurations.

It is to be understood by those skilled in the art that the relevant description the device for determining the spatial relation in the embodiments of the disclosure can be understood with reference to the relevant description of the method for determining the spatial relation in the embodiments of the disclosure.

Figure 6:
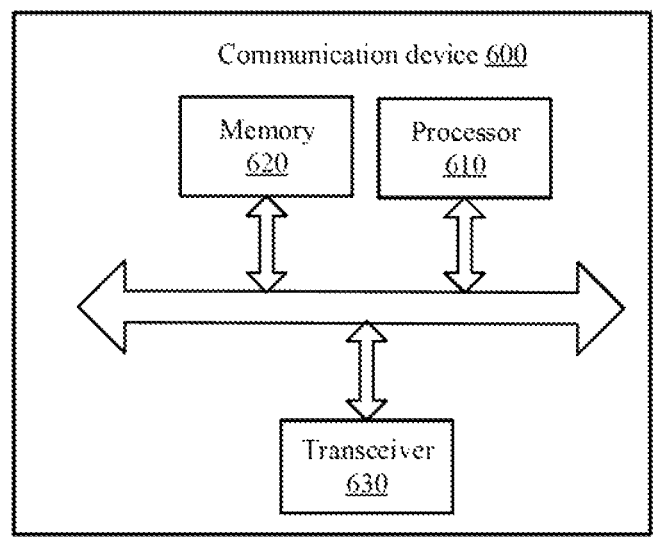
FIG. 6 is a schematic structural diagram of a communication device according to at least some embodiments of the present disclosure.

FIG. 6 is a schematic structural diagram of a communication device 600 provided in the embodiments of the present disclosure. The communication device can be UE or network device. The communication device 600 illustrated in FIG. 6 includes processor 610, and processor 610 can call and run computer programs from memory to realize the method in the embodiments of the present disclosure.

In an embodiment, as illustrated in FIG. 6, the communication device 600 may further include a memory 620. The processor 610 can invoke and run the computer program from memory 620 to implement the method in the embodiments of the disclosure.

The memory 620 may be a separate device independent of or integrate into the processor 610.

In an embodiment, as illustrated in FIG. 6, the communication device 600 may also include a transceiver 630. The processor 610 may control the transceiver 630 to communicate with other devices, in particular, to send information or data to other devices, or receive information or data sent by other devices.

The transceiver 630 may include a transmitter and a receiver. The transceiver 630 may further include antenna(s), the number of which may be one or more.

In an embodiment, the communication device 600 can be specifically a network device of the embodiment of the present disclosure, and the communication device 600 can realize the corresponding process realized by the network device in each method of the embodiments of the present disclosure. For sake of simplicity, it will not be elaborated here.

In an embodiment, the communication device 600 can be a mobile terminal/UE according to the embodiments of the present disclosure, and the communication device 600 can realize the corresponding flow realized by the mobile terminal/UE in the various methods of the embodiments of the present disclosure. For the sake of brevity, it will not be described here.

Figure 7:
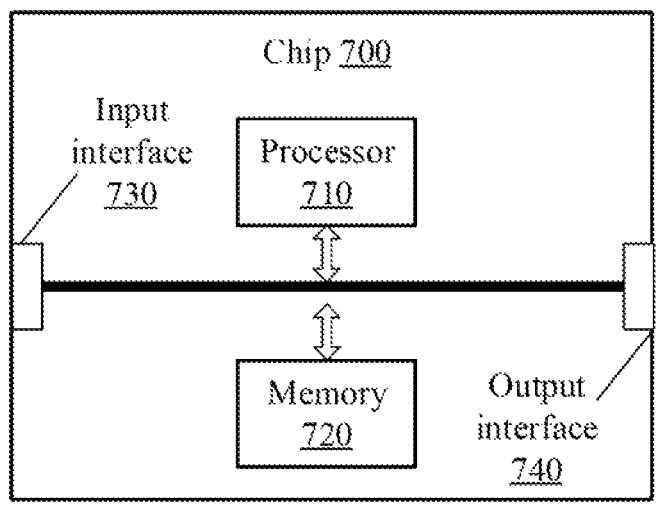
FIG. 7 a schematic structural diagram of a chip according to at least some embodiments of the present disclosure.

FIG. 7 is a schematic structural diagram of a chip according to an embodiment of the present disclosure. The chip 700 illustrated in FIG. 7 includes processor 710, and processor 710 can invoke and run computer programs from memory to implement the method in the embodiments of the disclosure.

In an embodiment, as illustrated in FIG. 7, the chip 700 may also include a memory 720. The processor 710 can invoke and run the computer program from memory 720 to implement the method in the embodiments of the disclosure.

The memory 720 may be a separate device independent of or integrated into the processor 710.

In an embodiment, the chip 700 may also include an input interface 730. The processor 710 can control the input interface 730 to communicate with other devices or chips, and in particular can obtain information or data sent by other devices or chips.

In an embodiment, the chip 700 may also include an output interface 740. The processor 710 may control the output interface 740 to communicate with other devices or chips, and in particular may output information or data to other devices or chips.

In an embodiment, the chip can be applied to the network device in the embodiments of the present disclosure, and the chip can realize the corresponding process realized by the network device in each method of the embodiments of the disclosure. For the sake of brevity, it will not be elaborated here.

In an embodiment, the chip can be applied to the mobile terminally in the embodiments of the present disclosure, and the chip can realize the corresponding flow realized by the mobile terminal/UE in each method of the embodiment of the disclosure. For the sake of simplicity, it will not be described here.

It is to be understood that the chips mentioned in the embodiments of the present disclosure can also be referred to as system level chips, system chips, chip systems or on-chip system chips, etc.

Figure 8:
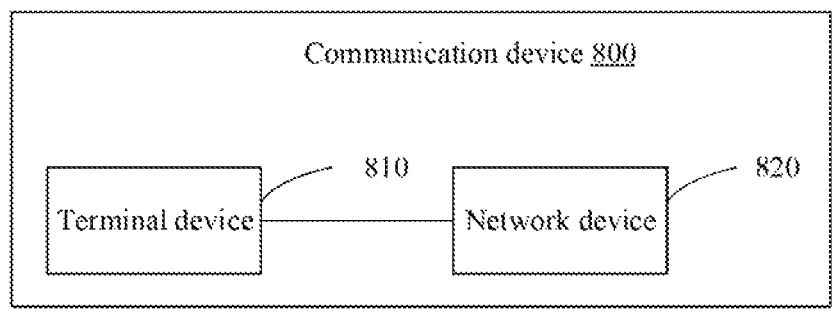
FIG. 8 is a schematic block diagram of a communication system according to at least some embodiments of the present disclosure.

FIG. 8 is a schematic block diagram of a communication system 800 provided by an embodiment of the present disclosure. As illustrated in FIG. 8, the communication system 800 includes UE 810 and a network device 820.

The UE 810 can be used to realize the corresponding functions realized by the UE in the above method, and the network device 820 can be used to realize the corresponding functions realized by the network device in the above method. For the sake of simplicity, it will not be elaborated here.

It is to be understood that the processor of the embodiment of the present disclosure may be an integrated circuit chip with signal processing capability. In the implementation process, each step of the above method embodiment can be completed by the instruction in the form of integrated logic circuit of hardware or software in the processor. The above processors can be general purpose processors, digital signal processors (DSPS), application specific integrated circuits (ASICs), field programmable gate arrays (FPGAs) or other programmable logic devices, discrete gate or transistor logic devices, and discrete hardware components. The disclosed methods, steps and logic block diagrams in the embodiments of the present disclosure can be implemented or executed. The general-purpose processor may be a microprocessor or the processor may be any conventional processor or the like. The steps of the method disclosed in connection with the embodiment of the present disclosure can be directly embodied in the execution completion of the hardware decoding processor, or by the combination of the hardware and software modules in the decoding processor. The software module can be located in random memory, flash memory, read-only memory, programmable read-only memory or electrically erasable programmable memory, register and other mature storage media in the art. The storage medium is located in the memory, and the processor reads the information in the memory and completes the steps of the above method in combination with its hardware.

It is to be understood that the memory in the embodiments of the present disclosure may be volatile memory or nonvolatile memory, or may include both volatile and nonvolatile memory. The nonvolatile memory can be read-only memory (ROM), programmable ROM (PROM), erasable Prom (EPROM), electrically erasable EPROM (EEPROM) or flash memory. Volatile memory can be random access memory (RAM), which is used as an external cache. Many forms of RAM are available, such as static RAM (SRAM), dynamic RAM (DRAM), synchronous DRAM (SDRAM), double data rate SDRAM (DDR SDRAM, enhanced SDRAM (esdram), synchlink DRAM (SLDRAM) and direct Rambus RAM (DR RAM). It is to be noted that the memory of the systems and methods described herein is intended to include, but is not limited to, these and any other suitable types of memory.

It is to be understood that the above described memory is exemplary but not restrictive. For example, the memory in the embodiment of the present disclosure can also be static RAM (SRAM), dynamic RAM (DRAM), synchronous dynamic random access memory (synchronous DRAM (SDRAM), double data rate SDRAM (DDR SDRAM), enhanced SDRAM (ESDRAM), synchronous link DRAM (SLDRAM), direct RAM (DR RAM), etc. That is to say, the memory in the embodiments of the present disclosure is intended to include, but not limited to, these and any other suitable types of memory.

The embodiments of the present disclosure also provide a computer-readable storage medium for storing computer programs.

In an embodiment, the computer-readable storage medium can be applied to the network device in the embodiment of the present disclosure, and the computer program enables the computer to execute the corresponding processes implemented by the network device in the various methods of the embodiment of the present disclosure. For the sake of brevity, it will not be repeated here.

In an embodiment, the computer-readable storage medium can be applied to the mobile terminal/UE in the embodiment of the present disclosure, and the computer program enables the computer to execute the corresponding processes implemented by the mobile terminal/UE in the various methods of the embodiment of the present disclosure. For the sake of brevity, it will not be repeated here.

The embodiment of the present disclosure also provides a computer program product, including a computer program instruction.

In an embodiment, the computer program product can be applied to the network device in the embodiments of the present disclosure, and the computer program instruction enables the computer to execute the corresponding processes implemented by the network device in the various methods of the embodiment of the disclosure. For the sake of brevity, it will not be repeated here.

In an embodiment, the computer program product can be applied to the mobile terminal/UE in the embodiments of the present disclosure, and the computer program instruction enables the computer to execute the corresponding process implemented by the mobile terminal/UE in the various methods of the embodiment of the disclosure, for the sake of brevity, it will not be repeated here.

The embodiment of the present disclosure also provides a computer program.

In an embodiment, the computer program can be applied to the network device in the embodiments of the present disclosure. When the computer program runs on the computer, the computer executes the corresponding process realized by the network device in each method of the embodiment of the disclosure. For the sake of brevity, it will not be described here.

In an embodiment, the computer program can be applied to the mobile terminal/UE in the embodiments of the present disclosure. When the computer program runs on the computer, the computer executes the corresponding process realized by the mobile terminal/UE in the various methods of the embodiment of the disclosure. For the sake of brevity, it will not be elaborated here.

Those of ordinary skill in the art may realize that the unit and algorithm steps of each example described in combination with the disclosed embodiments herein can be realized by the combination of electronic hardware, or computer software and electronic hardware. Whether these functions are performed in hardware or software depends on the specific application and design constraints of the technical solution. A professional technician may use different methods to implement the described functions for each specific application, but such implementation shall not be considered beyond the scope of the present disclosure.

Those skilled in the art can clearly understand that for the convenience and simplicity of the description, the specific working process of the system, device and unit described above can refer to the corresponding process in the embodiment of the method described above, and will not be described here.

In several embodiments provided by the present disclosure, it should be understood that the disclosed systems, devices and methods can be realized in other ways. For example, the embodiment of the device described above is only schematic. For example, the division of the unit is only a logical function division, and there can be another division method in actual implementation, for example, multiple units or components can be combined or integrated into another system, or some features can be ignored or not implemented. On the other hand, the mutual coupling or direct coupling or communication connection illustrated or discussed can be indirect coupling or communication connection through some interfaces, devices or units, and can be electric, mechanical or other forms.

The unit described as a separation part may or may not be physically separated, and the unit displayed as a unit may or may not be a physical unit, that is, it may be located in one place, or it may be distributed to multiple network units. Some or all of the units can be selected according to the actual needs to achieve the purpose of the embodiment.

In addition, each functional unit in each embodiment of the present disclosure may be integrated in one processing unit, each unit may exist physically alone, or two or more units may be integrated in one unit.

If the function is realized in the form of a software function unit and sold or used as an independent product, it can be stored in a computer readable storage medium. Based on such understanding, the technical solution of the present disclosure, in essence or in the form of a software product, which is stored M a storage medium, includes several instructions for making a computer device (which can be a personal computer, a server, a network device, etc.)) Perform all or part of the steps of the method according to each embodiment of the present disclosure. The aforementioned storage media include: U disk, mobile hard disk, read-only memory (ROM), random access memory (RAM), disk or optical disk and other media that can store program code.

The above is only the specific embodiments of the disclosure, but the scope of protection of the disclosure is not limited to this. Any person skilled in the technical field who can easily think of change or replacement within the technical scope of the disclosure shall be covered in the scope of protection of the disclosure. Therefore, the protection scope of the disclosure shall be subject to the protection scope of the claims.

What is claimed is:

1. A method for determining a spatial relation, comprising:
    receiving, by user equipment (UE), first configuration information from a network device, the first configuration information being used to determine N transmission configuration indicator (TCI) state configurations, N being a positive integer; wherein each of the N TCI state configuration is used to determine a reference signal, the reference signal is used to determine a quasi co-location (QCL) type D parameter, the QCL type D parameter is used by the UE to receive physical downlink shared channel (PDSCH); the reference signal is further used to determine a spatial relation information, the spatial relation information is used by the UE to transmit physical uplink shared channel (PUSCH);
    wherein the method further comprises;
    receiving, by the UE, second configuration information from a network device, the second configuration information being used to determine control resource set (CORESET) configuration; and
    receiving by the UE, a first DCI from the network device based on the CORESET configuration, the first DCI being used to scheduling first PUSCH transmission;
    wherein the second configuration information is used to carry first indication information, the first indication information is used to indicate whether second indication information is carried in the first downlink control information (DCD) or to indicate that the first DCI carries the second indication information, wherein the second indication information is used to indicate a first TCI state configuration of the N TCI state configurations, the first TCI state configuration is used for the first PUSCH transmission.

2. The method of claim 1, wherein the second indication information is a first bitmap, each bit in the first bitmap corresponds to a TCI state configuration of the N TCI state configurations, a value of each bit is used to indicate whether the TCI state configuration corresponding to the bit is used for the first PUSCH transmission.

3. The method of claim 1, wherein when the first indication information is used to indicate that the first DCI carries the second indication information, the method further comprises:
 determining, by the UE, first spatial relation information based on a first reference signal in the first TCI state configuration; and
 transmitting, by the UE, the first PUSCH, based on the first spatial relation information.

4. The method of claim 1, wherein when the first indication information is used to indicate the second indication information is not carried in the first DCI, or the second configuration information does not carry the first indication information, the method further comprises:
 determining, by the UE, a second spatial relation information based on a second reference signal in a second TCI state configuration; and
 transmitting, by the UE, the first PUSCH, based on the second spatial relation information.

5. The method of claim 4, wherein the second TCI state configuration is a TCI state configuration associated with the CORESET;
 wherein the second TCI state configuration is used to determine the second reference signal, the second reference signal is used to determine QCL type D parameter and the second spatial relation information.

6. The method of claim 4, wherein the second TCI state configuration is a default TCI state configuration of the N TCI state configurations.

7. The method of claim 6, wherein
 the default TCI state configuration is a TCI state configuration with a smallest serial number of the N TCI state configurations; or
 the default TCI state configuration is a TCI state configuration with a largest serial number of the N TCI state configurations.

8. A device for determining a spatial relation, applied to user equipment (UE), the device comprising:
 at least one processor;
 a communication interface connected with the at least one processor; and
 a memory connected with the at least one processor;
 wherein,
 the memory stores instructions executable by the at least one processor, and the instructions are executed by the at least one processor to enable the at least one processor to:
 receive, through the communication interface, first configuration information from a network device, the first configuration information being used to determine N transmission configuration indicator (TCI) state configurations, N being a positive integer; wherein each of the N TCI state configuration is used to determine a reference signal, the reference signal is used to determine a quasi co-location (QCL) type D parameter, the QCL type D parameter is used by the UE to receive physical downlink shared channel (PDSCH); the reference signal is further used to determine a spatial relation information, the spatial relation information is used by the UE to transmit physical uplink shared channel (PUSCH);
 wherein the at least one processor is further configured to
 receive through the communication interface, second configuration information from the network device, the second configuration information being used to determine control resource set (CORESET) configuration; and receive, through the communication interface, a first DCI from the network device based on the CORESET configuration, the first DCI being used to scheduling first PUSCH transmission;
 wherein the second configuration information is used to carry first indication information, the first indication information is used to indicate whether second indication information is carried in the first DCI or to indicate that the first DCI carries the second indication information, wherein the second indication information is used to indicate a first TCI state configuration of the N TCI state configurations, the first TCI state configuration is used for the first PUSCH transmission.

9. The device of claim 8, wherein when the first indication information is used to indicate that the first DCI carries the second indication information, the at least one processor is further configured to:
 determine first spatial relation information based on a first reference signal in the first TCI state configuration; and
 transmit, through the communication interface, the first PUSCH, based on the first spatial relation information.

10. The device of claim 8, wherein the at least one processor is further configured to:
 when the first indication information is used to indicate the second indication information is not carried in the first DCI, or the second configuration information does not carry the first indication information, determine a second spatial relation information based on a second reference signal in a second TCI state configuration; and
 transmit, through the communication interface, the first PUSCH based on the second spatial relation information.

11. A device for determining spatial relation, applied to a network device, the device comprising:
 at least one processor;
 a communication interface connected with the at least one processor; and
 a memory connected with the at least one processor;
 wherein,
 the memory stores instructions executable by the at least one processor, and the instructions are executed by the at least one processor to enable the at least one processor to:
 send, through the communication interface, first configuration information to user equipment (UE), the first configuration information being used to determine N TCI state configurations, N being a positive integer, wherein each of the N TCI state configurations is used to determine a reference signal, the reference signal is used to determine a quasi co-location (QCL) type D parameter, the QCL type D parameter is used by the UE to receive physical downlink shared channel (PDSCH); the reference signal is further used to determine a spatial relation information, the spatial relation information is used by the UE to transmit physical uplink shared channel (PUSCH);

wherein the at least one processor is further configured to: send, through the communication interface second configuration information to the UE the second configuration information being used to determine Control Resource Set (CORESET) configuration; and send through the communication interface, a first DCI to the UE based on the CORESET configuration, the first DCI being used to schedule first PUSCH transmission;

wherein the second configuration information is used to carry first indication information, the first indication information is used to indicate whether second indication information is carried in the first DCI or to indicate that the first DCI carries the second indication information, wherein the second indication information is used to indicate a first TCI state configuration of the N TCI state configurations, the first TCI state configuration is used for the first PUSCH transmission.

12. The device of claim 11, wherein when the first indication information is used to indicate that the first DCI carries the second indication information, a first reference signal in the first TCI state configuration is used by the UE to determine a first spatial relation information, the first spatial relation information is used by the UE to transmit the first PUSCH.

13. The device of claim 11, wherein when the first indication information is used to indicate the second indication information is not carried in the first DCI, or the second configuration information does not carry the first indication information, a second reference signal in second TCI state configuration is used by the UE to determine a second spatial relation information, the second spatial relation information is used by the UE to transmit the first PUSCH.

14. A non-transitory computer-readable storage medium having stored thereon a computer program which makes a computer to perform the method of claim 1.

* * * * *